*INVENTORS*
*ROLLAND R. ROUP*
*CHARLES E. BUTLER*
BY
*John W. Michael*
ATTORNEY.

Patented Aug. 29, 1950

2,520,376

UNITED STATES PATENT OFFICE 2,520,376

LAYERIZED HIGH DIELECTRIC CONSTANT PIECE FOR CAPACITORS AND PROCESS OF MAKING THE SAME

Rolland R. Roup and Charles E. Butler, Milwaukee, Wis., assignors to Globe-Union Inc., Milwaukee, Wis., a corporation of Delaware Application May 22, 1948, Serial No. 28,594

8 Claims. (Cl. 25—157)

This invention relates to improvements in solid dielectric compositions and particularly to a ceramic piece of higher than usual dielectric constant having mechanical strength adapting it for use in electric capacitors, and to processes for producing such ceramic pieces.

There is a need for electric capacitors of high rating which are small enough to comply with the present day minimum space requirements of the electronics industry. While high rating can be obtained by using a very thin dielectric, this is not practical for ceramic capacitors. In these capacitors the dielectric forms the support for the plates. It must, therefore, be mechanically strong enough to provide such support, avoid breakage during manufacture and handling, and resist warpage. Therefore, to provide the desired increased capacitance and maintain the mechanical strength, the dielecetric constant of the ceramic dielectric must be greatly increased. Ceramic dielectrics have been made which have dielectric constants ranging as high as 5000 or 6000. While higher dielectric constants can be obtained under certain firing conditions, there has also been such a lowering of resistance and increase of power factor that the piece had no practical or general use in electric capacitors.

It is, therefore, an object of the present invention to provide a dielectric ceramic material with a dielectric constant substantially higher than heretofore known and with sufficient electrical resistance to be useful as the dielectric in a capacitor.

A further object of the invention is to provide a process for making a ceramic dielectric piece having a higher value of dielectric constant than heretofore known, high enough resistance, low enough power factor, and sufficient mechanical strength to be useful for the dielectric in a capacitor.

To accomplish these objects there is added to an alkaline earth titanate or a mixture of such titanates a small quantity of a rare earth oxide or a mixture of such oxides, or thorium oxide. The mixture is shaped in the customary manner and is fired to provide a piece having a layer of reduced material and a layer of oxidized material. The solid piece with such layer effect has a greatly increased effective dielectric constant with a satisfactory high resistance and low power factor. It also has sufficient mechanical strength to permit its use in ceramic capacitors.

The basic material of the mixture may be one or more of the alkaline earth titanates, such as barium titanate, strontium titanate or calcium titanate. There may be included an alkaline earth zirconate, such as barium zirconate. In the firing process it is desired to reduce the form of the titanates in one portion of the piece and this action is greatly increased by the presence of very small quantities of thorium oxide or a rare earth oxide, such as cerium, lanthanum, neodymium, praseodymium, or samarium oxides, or mixtures of such oxides. Tests have shown that the amount of such reducing catalyst may vary from less than .5% to approximately 5% and that the smaller quantities produce the best results. The firing may be done in a single step or in a multiple of steps. If done in a single step one surface of the piece is subjected to a reducing atmosphere or condition and the other surface of the piece to an oxidizing atmosphere or condition. If done in a multiple of steps, the piece may be first fired to maturity while completely subjected to an oxidizing atmosphere and then refired at a lower temperature with one surface subjected to an oxidizing atmosphere and another surface subjected to a reducing atmosphere. Another variation is firing to maturity in a reducing atmosphere and refiring in an oxidizing atmosphere with one surface subjected to a reducing atmosphere. In this step a part of the reduced area is oxidized. Pieces so fired have distinctly defined layers with an abrupt change in color at the dividing line. The oxidized layer is light to medium dark tan in color while the reduced layer is dark grey to black or blue-black in color. Control of the thickness of the reduced layer can be had to some degree by control of temperature and firing time and by control of the oxidizing and reducing atmospheres. Tests of pieces so prepared show that they have dielectric constants as high as 19,000 to 20,000, satisfactory low power factors and resistance in excess of 20 megohms. They also have satisfactory dielectric constant temperature coefficients.

By way of illustration the following examples show the composition of the ceramic pieces embodying the invention and how it may be practiced but the invention is not to be limited thereto. For better understanding reference may be had to the accompanying drawing, in which.

Figure 1:
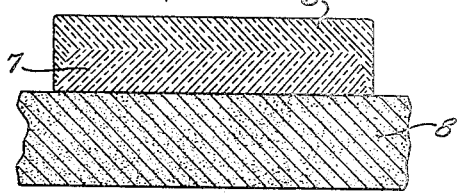
Fig. 1 is a cross-sectional view of a ceramic disc embodying the invention as positioned on a carbon block upon which it rested during the firing process.
Figure 2:
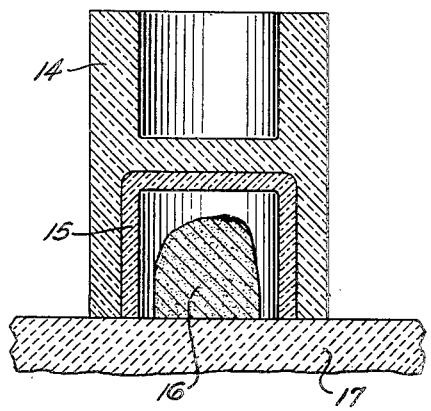
Fig. 2 is a cross-sectional view of a cup-shaped ceramic piece embodying the invention as positioned on a furnace hearth over a pellet of carbon during the firing process.
Figure 3:
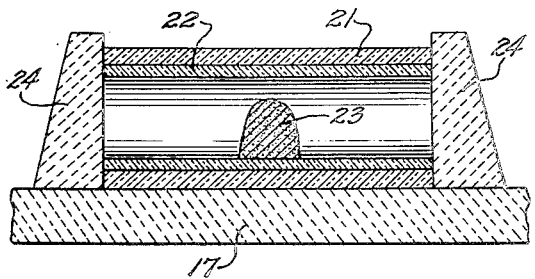
Fig. 3 is a cross-sectional view of a tube-shaped ceramic piece embodying the invention as positioned on a furnace hearth with a pellet of carbon in the tube during the firing process.

Referring to the drawings by reference numerals, a ceramic mixture of the following composition:

| | Per cent |
|---|---|
| Barium titanate | 84.5 |
| Strontium titanate | 15.0 |
| Mixture of rare earth oxides | .5 |

(the rare earth mixture consisted of approximately 30% neodymium, 20% praseodymium, 45% lanthanum, and 5% samarium oxides) was formed into a disc (Fig. 1) and placed on a carbon block 8 in a gas-fired kiln. The oxidizing atmosphere of the kiln was approximately 4% to 7% excess oxygen. The temperature (approximately 2475° F.) was high enough to mature the disc and the time of firing short enough so that all the carbon did not burn away from beneath the disc. The carbon block was porous and as it burned it supplied the reducing atmosphere or condition affecting a portion of the disc from the surface which rested on such block. The disc thus fired had a light upper layer 6 and a dark lower layer 7. These layers were divided by a distinct line, as indicated. Tests of the disc so fired indicated a dielectric constant of approximately 19,000, a power factor of less than 13% and a resistance of over 20 megohms. The disc had a mechanical strength sufficient to withstand the shocks of practical usage of ceramic capacitors.

In a second example a disc of the same composition was first fired in an oxidizing atmosphere of 4% to 7% excess oxygen at 2470° F. and then refired on a carbon block at a lower temperature of say 2360° F. The resultant disc had substantially the same electrical and physical properties as the disc of the first example.

Figure 4:
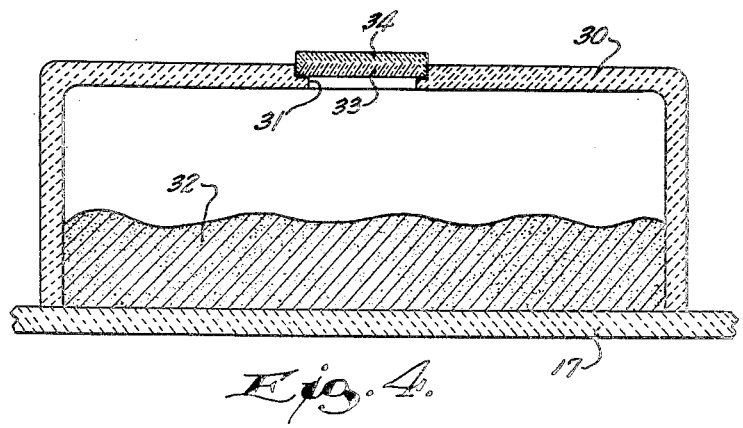
Fig. 4 is a cross-sectional view of a disc embodying the present invention as positioned in the opening of a sagger or refractory box containing a mass of carbon during the firing process.

In a third example a disc of the same composition as the first disc was placed on the shouldered hole 31 of the sagger box 30 (Fig. 4), the box 30 being positioned on the refractory plate 17 and containing a mass of carbon 32. The atmosphere of the furnace was oxidizing and the temperature substantially 2475° F. The upper layer 34 of the disc being subjected to the oxidizing atmosphere was light in color while the lower layer 33 being subjected to the reducing atmosphere was dark in color. The disc had substantially the same electrical and physical characteristics as the first disc.

Cups and tubes of the same composition as the first disc were fired in kilns having an oxidizing atmosphere and temperature substantially like that of the third example. The cup had a pellet of carbon 16 within its inverted portion. The tube had a pellet of carbon 23 in its bore; the ends being plugged by refractory blocks 24. As a result of the firing a layerized effect was again produced, the cup having a dark layer 15 and a light layer 14 and the tube a dark inner layer 22 and a light outer layer 21. These layers resembled the layers of the discs of the first three examples and substantially the same electrical and physical properties were present in the cup and tube as in the discs.

In order to establish the essentiality of small amounts of rare earth oxide or mixture thereof, or thorium oxide, and the range of percentage of such amounts to the total mixture, several compositions as set forth in the table below were prepared. A disc of each composition was matured in an oxidizing atmosphere in the usual manner (approximately 2475° F.). Each disc was then measured for dielectric constant, power factor in percentage, and resistance in megohms. These results are tabulated on lines "A." The discs were then refired at approximately 2360° F. in the manner prescribed in the second example. The electrical properties were again measured at and the results tabulated on the lines "B."

*Composition*

| | | | | |
|---|---|---|---|---|
| Barium titanate | 85.0 | 84.5 | 80.0 | 75.0 |
| Strontium titanate | 15.0 | 15.0 | 15.0 | 15.0 |
| Reducing catalyst | .0 | 0.5 | 5.0 | 10.0 |

*Test results*

| | | | | |
|---|---|---|---|---|
| Dielectric constant: | | | | |
| A | 1,950 | 5,540 | 653 | 345 |
| B | 2,060 | 19,000 | 7,470 | 2,000 |
| Power factor: | | | | |
| A | 0.8 | 1.0 | 0.3 | 0.2 |
| B | 1.6 | 12.4 | 5.3 | 3.1 |
| Resistance: | | | | |
| A | over 20 | over 20 | over 20 | over 20 |
| B | over 20 | over 20 | 7 | over 20 |

This analysis shows that the use of a trace or small amount of the rare earth oxide or mixture of such oxides, or thorium oxide, produces the greatest dielectric constant consistent with good resistance. The trace amounts of such oxides apparently increase the ease of reduction of the titanate bodies to the lower oxide form and also are particularly effective in aiding the formation of the layerized piece. They also seem to increase the dielectric constant of both layers.

To establish the essentiality of the layerized effect a disc of the ceramic mix containing none of the reducing catalyst and a disc of the mix containing only 0.5% of the reducing catalyst were each fired to maturing temperature on carbon slabs in reducing atmosphere. When tested these discs had a dielectric constant of 48,600 and 421,000, respectively, but their resistance was under 5,000 ohms and their power factor over 22% which made them impractical for use in ceramic capacitors.

It will thus be seen that the dielectric formed either from a mixture of titanates with a trace of thorium oxide or rare earth oxides or from a mixture of titanates and zirconates with such oxide or oxides and fired so as to create a layerized piece has heretofore unknown combinations of high dielectric constant and good resistance.

While several embodiments of the invention and details of procedure have been shown and described, it is to be understood that ingredients, proportions, and procedures may be considerably varied without departing from the spirit of the invention and the scope of the following claims.

We claim:

1. A process for making a ceramic dielectric piece having a high dielectric constant and a high resistance comprising mixing an alkaline earth titanate with a small amount of a rare earth oxide to act as a reducing catalyst, shaping the mixture into a piece of desired form, and firing the piece with one portion subject to an oxidizing atmosphere and another portion subject to a reducing atmosphere to layerize the piece.

2. A process for making a ceramic dielectric piece having a high dielectric constant and a high resistance comprising mixing an alkaline earth titanate with a small amount of a catalytic oxide, shaping the mixture into a piece of desired form, and firing the piece to maturity in an oxidizing atmosphere with a portion thereof on a carbon block to subject such portion to a reducing atmosphere to layerize the piece.

3. A process for making a ceramic dielectric piece having a high dielectric constant and a high resistance comprising mixing an alkaline earth titanate with a small amount of a catalytic oxide, shaping the mixture into a piece of desired form, firing the piece in an oxidizing atmosphere to maturity, and then refiring the piece in an oxidizing atmosphere with a portion thereof on a carbon block to subject such portion to a reducing atmosphere to layerize the piece.

4. A process for making a ceramic dielectric piece having a high dielectric constant and a high resistance comprising mixing an alkaline earth titanate with a small amount of a catalytic oxide, shaping the mixture into a piece of desired form, firing the piece to maturity in a reducing atmosphere, and refiring the piece in an oxidizing atmosphere with a portion thereof on a carbon block to subject such portion to a reducing atmosphere to layerize the piece.

5. A process for making a ceramic dielectric piece having a high dielectric constant and a high resistance comprising mixing an alkaline earth titanate with a small amount of a catalytic oxide, shaping the mixture into a piece of desired form, and firing the piece to maturity with one portion subjected to an oxidizing atmosphere and another portion subjected to a reducing atmosphere to layerize the piece.

6. A solid ceramic dielectric having a dielectric constant above 5,000, and a resistance in excess of 20 megohms consisting of a mass of at least 95% by weight of alkaline earth titanate and the remainder consisting of a reducing catalyst, said mass being matured to completeness with one portion thereof consisting of a layer of reduced titanate and another portion thereof consisting of a layer of oxidized titanate.

7. A process for causing a ceramic piece containing an alkaline earth titanate and a small amount of rare earth oxide acting as a reducing catalyst to have a high dielectric constant and a high resistance comprising, layerizing said piece by reducing one portion thereof and oxidizing another portion thereof.

8. A body of high dielectric ceramic material consisting essentially of an alkaline earth titanate and a reducing catalyst, said body having a layer which is essentially oxidized titanate and another layer which is essentially reduced titanate.

ROLLAND R. ROUP.
CHARLES E. BUTLER.

REFERENCES CITED

The following references are of record in the file of this patent:

UNITED STATES PATENTS

| Number | Name | Date |
| --- | --- | --- |
| 2,050,225 | Kohler | Aug. 4, 1936 |
| 2,091,569 | Ridgway et al. | Aug. 31, 1937 |
| 2,071,452 | Block | Feb. 23, 1946 |
| 2,398,088 | Ehlers | Apr. 9, 1946 |
| 2,434,236 | Verwey et al. | Jan. 6, 1948 |